Figure 1:
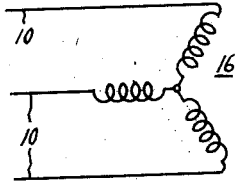

March 31, 1942.  E. E. MOYER  2,278,211
ELECTRIC CIRCUITS
Filed July 6, 1940

Inventor:
Elmo E. Moyer,
by Harry E. Dunham
His Attorney.

Patented Mar. 31, 1942

2,278,211

UNITED STATES PATENT OFFICE 2,278,211

ELECTRIC CIRCUITS

Elmo E. Moyer, Scotia, N. Y., assignor to General Electric Company, a corporation of New York Application July 6, 1940, Serial No. 344,281

7 Claims. (Cl. 175—363)

My invention relates to electric circuits and more particularly to control circuits for an electric valve system interconnecting direct and alternating current circuits.

In many applications, such as in regulating circuits, it is desirable to obtain an electrical quantity which varies in response to another electrical quantity in which the variation takes place without any time delay. In particular, it is desirable to obtain a pure direct current potential, the magnitude of which varies in accordance with the amplitude of an alternating current potential and has no time delay between the variations in the amplitude of the alternating current potential and the resultant variation in the magnitude of the direct current potential, and accordingly, I have provided an improved electric valve circuit for obtaining a pure direct current potential, the magnitude of which is at all times proportional to the amplitude of an alternating current potential. The circuit of the present invention is also adapted to transmit energy from a direct current circuit to an alternating current circuit with an improved wave form. When applied to communication circuits, the present invention reduces undesirable noises to a minimum by the elimination of ripple from the direct current potential.

It is an object of my invention to provide a new and improved electric valve circuit.

It is another object of my invention to provide a new and improved electric valve circuit for deriving a ripple-free or pure direct current potential from an alternating current potential.

It is another object of my invention to provide a controlled electric valve circuit for transmitting energy between direct and alternating circuits which is controlled in an improved manner.

It is a further object of my invention to provide an improved electric circuit for obtaining a direct current potential proportional to the amplitude of an alternating current potential.

It is still another object of my invention to provide an improved electric circuit for producing a direct current potential, the magnitude of which varies in accordance with the variation in amplitude of an alternating current potential and in which the variation occurs without time delay.

In accordance with an illustrated embodiment of my invention I provide an electric translating apparatus including a three-phase transformer and a plurality of electric valves of the high vacuum type for interconnecting a three-phase alternating current circuit and a direct current circuit. The electric valves are grid controlled and are energized by potentials which vary inversely and in proportion to the variations in the anode-cathode voltages supplied to the electric valves by the secondary winding of the transformer.

My invention will be better understood by reference to the following description taken in connection with the accompanying drawing and its scope will be pointed out in the appended claims. In the drawing, Fig. 1 is a diagrammatic representation of one embodiment of my invention, and Fig. 2 illustrates the potential variations in certain portions of the circuit disclosed in Fig. 1.

Referring to the drawing, a three-phase alternating current circuit 10 is interconnected with a direct current circuit 11 by electric translating apparatus including a three-phase transformer 12 and a plurality of electric valves 13, 14 and 15. The transformer 12 includes a Y-connected primary winding 16 connected with the alternating current circuit 10 and a Y-connected secondary winding 17 having the end terminals thereof connected with the anodes 18 of the electric valves 13 to 15. The cathodes 19 of the electric valves are connected together by a conductor 20 and to one terminal of a resistor 21 across which the direct current circuit 11 is connected. The other terminal of the resistor 21 is connected to the neutral terminal 22 of the Y-connected secondary winding 17 of the transformer 12. Each of the valves 13 to 15 is provided with a control member or grid 23 which is energized from a control or excitation circuit designated generally by the numeral 24. The valves 13 to 15 are of the type in which the control member may be energized to control continuously the impedance of the valve. These valves may be designated as of the high vacuum or variable impedance type and preferably have a grid voltage-anode current characteristic such that they conduct considerable current when the potential of the control members 23 is the same as the potential of the cathodes 19.

In order to obtain a pure direct current across the resistor 19 it is necessary to increase the impedance of the valves 13 to 15 as the anode-cathode potentials impressed thereon by the secondary winding 17 increases and this is accomplished by the excitation circuit 24 which will now be described. The excitation circuit includes a Y-connected transformer winding 25 which may be wound on the same core with the transformer windings 16 and 17 and in the illustrated embodiment it forms another secondary winding of the transformer 12. The end terminals of the winding 25 are connected, respectively, to the control members or grids 26 of control electric valves 27 to 29, each of which is also provided with an anode 30 and a cathode 31. The cathodes are connected together and to the neutral terminal 32 of the Y-connected transformer winding 25 through a resistor 33. The anode-cathode circuit of the electric valves 27 to 29 is completed through a battery 34 and individual anode resistors 35, 36 and 37. The control members 23 of the electric valves 13 to 15 are each connected with a different one of the resistors 35 to 37 by conductors 38, 39 and 40, respectively. The electric valves 27 to 29 are also of the high vacuum or variable impedance type and have characteristics such that the plate current decreases very rapidly as the positive potential of the control members, or grids 26, approaches zero with respect to the cathodes 31, or if the valves conduct considerable current at zero grid potential, this current may be further reduced by a negative biasing means which may be included in each of the conductors connecting the control members with the end terminals of the transformer winding 25 or included in series with the common conductor 41.

Figure 2:
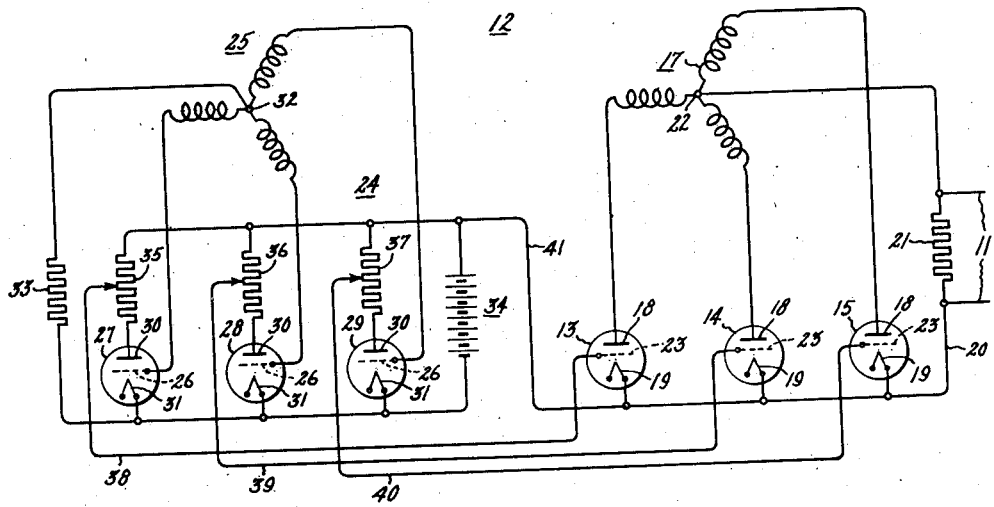
Figure 2:
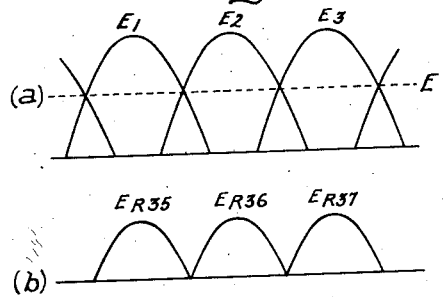

A better understanding of the features and advantages of my invention may be had by a consideration of the operation of the circuit shown in Fig. 1. It will be apparent to those skilled in the art that in the absence of the control circuit 24 the electric valves 13 to 15 and the transformer 12 will be effective to transmit energy from the alternating current circuit 10 to the direct current circuit 11 and that the direct current potential will include harmonic components of considerable magnitude. Since there is shown a pure resistance direct current load the pulsating voltage appearing across the resistor 21 has the same phase relation as the alternating potentials of the secondary windings of the transformer. In accordance with a feature of the present invention the excitation circuit 24 functions to vary the impedance of the valves 13 to 15 as the anode-cathode voltages of these valves vary so that the magnitude of the direct current and consequently the voltage across resistor 21 is substantially a pure direct current potential. The excitation circuit 24 includes the valves 27 to 29 which have applied to the anode-cathode circuits thereof the potential of battery 34 less the voltage drop across the resistors 35, 36 and 37. The control members 26 are energized by the phase windings of the transformer winding 25 by potentials which are in phase with the corresponding anode-cathode potentials of the valves 13 to 15. Since the impedance of the valves 27 to 29 decreases as the potential of the control member 26 increases positively, the current through resistors 35 to 37 increases as the corresponding phase potentials increase positively. The resulting voltage changes across resistors 35 to 37 are applied to the control members of the corresponding valves 13 to 15 by the conductors 38, 39 and 40 and the conductor 41 which interconnects the common terminal of the resistors 35 to 37 with the cathodes of the valves 13 to 15. Since the anode-cathode circuits of the valves 27 to 29 are purely resistive this current will be in phase with the voltages impressed thereon by the transformer winding 25 and therefore the potentials supplied to the control member 20 of the valves 13 to 15 will become increasingly negative as the anode potential of these valves becomes more positive with the result that the direct current output voltage approaches a value equal to that of the phase voltages of the winding 17.

In Fig. 2(a) the phase voltages of winding 25 have been designated by curves $E_1$, $E_2$ and $E_3$ which intercept on a line E. Each of the valves 27 to 29 conducts for the 120° interval during which the voltage applied to its control member is above the potential E, assuming that the valves 27 to 29 become non-conducting at zero grid potential. In Fig. 2(b) the potentials appearing across resistors 35 to 37 are illustrated as $E_{R35}$, $E_{R36}$, and $E_{R37}$. By means of conductors 38, 39, 40 and 41 these potentials are impressed on control members 23 of valves 13 to 15 respectively, and in an inverted sense so that the impedance of valves 13 to 15 varies inversely as the anode-cathode voltages thereof. It is apparent from the above discussion that if the amplitude of the potential of the alternating current circuit 10 increases, the amplitude of the anode-cathode voltages of the valves 13—15 also increases so that the output potential across the resistor 21 has a greater magnitude corresponding to the increased value of voltage at the intercepts of the phase voltages applied to the anode-cathode circuits of the valves 13—15. The magnitude of voltages $E_{R35}$, $E_{R36}$ and $E_{R37}$ also increases so that the control members 23 of valves 13, 14 and 15 are rendered more negative as the amplitude of the anode potentials increases. By proper consideration of the electric valve characteristics and the resistance elements utilized the circuit of the present invention provides a simple arrangement for obtaining a substantially pure direct current potential, the magnitude of which is equal to or less than the value of the intercept E and varies in instantaneous proportion to the amplitude of the potential of an alternating current circuit.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a direct current circuit, means including a plurality of main electric valves for transmitting energy between said circuits, means for varying the conductivities of said main electric valves inversely with respect to the alternating potentials impressed on the anode-cathode circuits thereof including a plurality of auxiliary electric valves, means for varying the conductivities of said auxiliary valves in accordance with the instantaneous potential of said alternating current circuit and means for impressing a voltage dependent upon the conductivities of said auxiliary valves on the control members of said main electric valves.

2. In combination, a polyphase alternating current circuit, a direct current circuit, a plurality of electric valves interconnecting said circuits and each including an anode, a cathode and a control member, a control circuit for controlling the conductivities of said valves including means for obtaining a pulsating potential having the form of that portion of the phase voltages of said polyphase alternating current circuit appearing above the intercepts thereof and a magnitude substantially directly proportional to said portion of the phase voltages and impressing said voltage on the control members of said main valves in an inverted sense to vary the conductivities thereof inversely with respect to the anode-cathode voltages applied thereto thereby to maintain the voltage of said direct current substantially free from harmonics and variable in magnitude with variations in the amplitude of the voltage of said alternating current circuit.

3. In combination, a polyphase alternating current circuit, a direct current circuit means including an electric valve interconnecting each phase of said alternating current circuit with said direct current circuit, each of said valves including a control electrode and being of the type in which the control electrode may be energized to control continuously the impedance thereof, a control circuit for energizing the control members of said valves including a plurality of auxiliary valves having control members capable of continuously controlling the impedance thereof, means for energizing the control members of said auxiliary valves in accordance with the alternating current potentials of said alternating current circuit, and means associated with said auxiliary valves for impressing a potential on the control member of each of said main valves which varies inversely with the anode-cathode potential of said main valves so that a substantially pure direct current potential is impressed on said direct current circuit.

4. In combination, a polyphase alternating current circuit, a direct current circuit, a plurality of electric discharge valves interconnecting said circuits for transmitting energy therebetween, each of said valves including a control electrode and being of the type which the impedance thereof may be controlled continuously by energization of said control electrode, means for deriving periodic potentials proportional to and in time phase coincidence with that portion of the alternating current potential waves of said alternating current circuit, appearing above the intercepts thereof, and means for impressing said potentials on said electric valves in an inverted sense to increase the impedance thereof as the anode-cathode potential applied thereto increases so that the magnitude of the direct current potential applied to said direct current circuit is substantially proportional to the amplitude of the alternating current potential of said alternating current circuit.

5. In combination, a polyphase alternating current circuit, a direct current circuit, a polyphase rectifier comprising a plurality of main electric valves including a control member and interconnecting said circuits, a control circuit for controlling the energization of the said control member to impress on said direct current circuit a substantially pure direct current potential having a magnitude proportional to the amplitude of the alternating current potential of said alternating current circuit including a plurality of control electric valves each having a control member, means for energizing the control member of said control valves in accordance with the alternating current potentials of said alternating current circuit, and means for deriving a voltage from the anode-cathode circuit of said control electric valves which varies inversely with the alternating current potential of said alternating current circuit and impressing said last-named potential on the control members of said main electric valves.

6. In combination, an alternating current circuit, a direct current circuit, means including a plurality of main electric valves for transmitting energy between said circuits, each of said valves including a control member, a control circuit for controlling the excitation of said control members including a source of direct current potential, a plurality of control electric valves, a resistor connected in series with the anode-cathode circuit of each of said valves, each of said series connected resistors and valves being connected in parallel with said source of direct current potential, means for controlling the energization of the control members of each of said control valves in accordance with the potential of said alternating current circuit, and means for impressing a potential appearing across a portion of each of said resistors on the control member-to-cathode circuit of a different one of the main electric valves to vary the conductivity thereof inversely with respect to the instantaneous voltage variation of the anode-cathode circuit thereof.

7. In combination, a polyphase alternating current circuit, a direct current circuit, a plurality of electric valves interconnecting said circuits and each including an anode, a cathode and a control member, a control circuit for controlling the energization of said control members to control the conductivities of said electric valves comprising means for impressing on each of said control members a voltage which varies inversely with and is proportional in magnitude to that portion of the anode-cathode voltage appearing above the intercepts of the voltage waves of said polyphase alternating current circuit to maintain the voltage of said direct current circuit substantially free of harmonics and equal to the instantaneous value of the alternating current voltage at the intercepts of the voltage waves of said alternating current circuit.

ELMO E. MOYER.